Sept. 1, 1931.  H. ZEH  1,820,930
GLASS DRAWING MACHINE
Filed March 23, 1929  3 Sheets-Sheet 1

INVENTOR

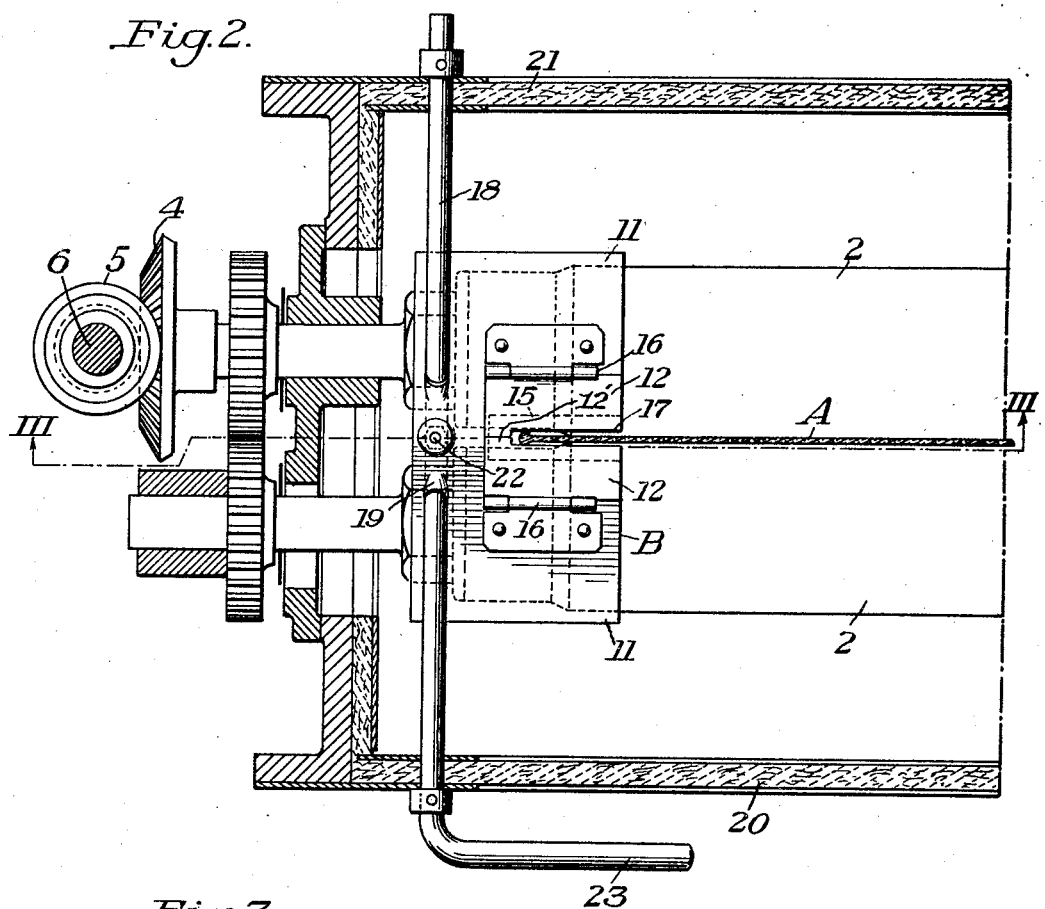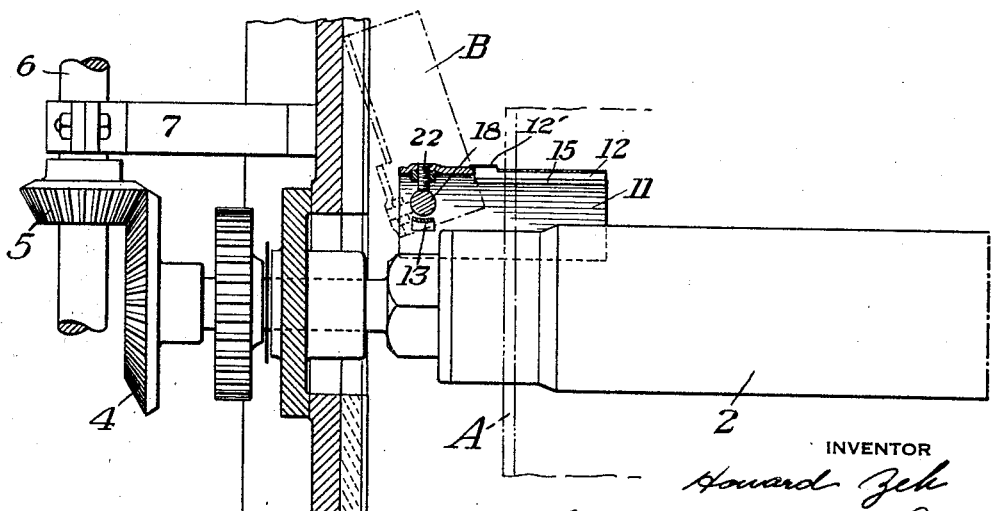

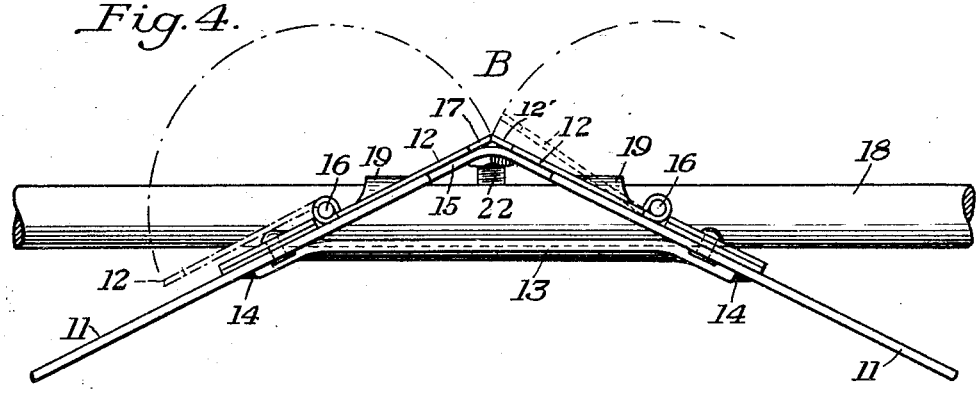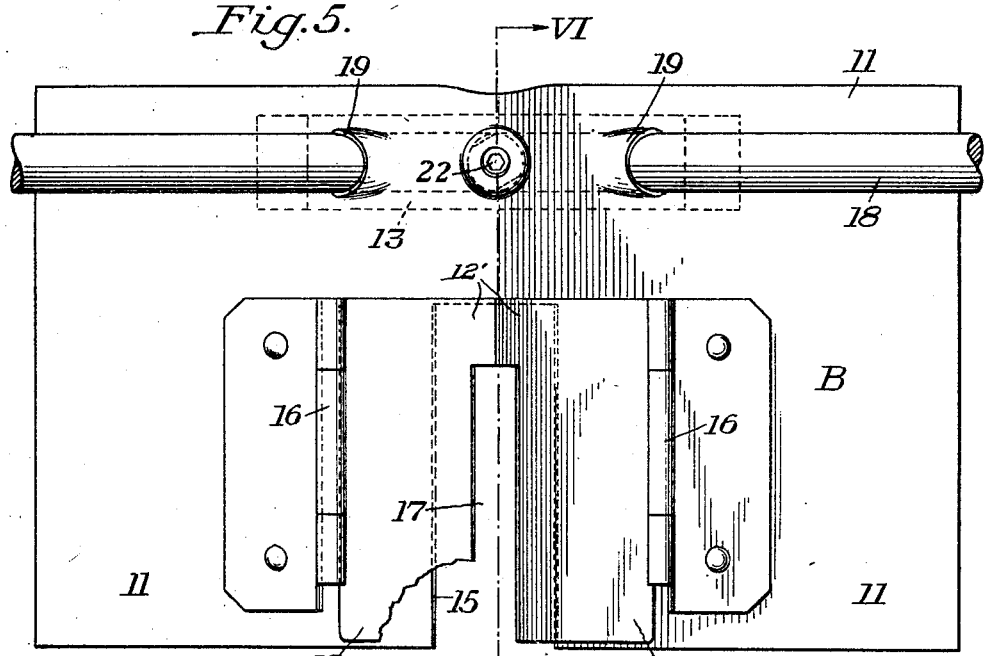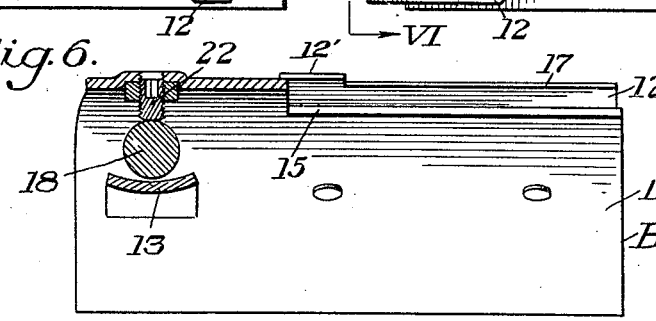

Patented Sept. 1, 1931

1,820,930

UNITED STATES PATENT OFFICE

HOWARD ZEH, OF BELLE VERNON, PENNSYLVANIA, ASSIGNOR TO WINDOW GLASS MACHINE COMPANY, OF PITTSBURGH, PENNSYLVANIA, A CORPORATION OF NEW JERSEY

GLASS DRAWING MACHINE

Application filed March 23, 1929. Serial No. 349,349.

This invention relates generally to glass drawing apparatus, and more particularly to flags used in connection with glass drawing machines, such as those of the Fourcault type, for deflecting particles of broken glass away from the sheet which is being drawn so that they will not fall into the bath.

In drawing sheet glass, beads generally are formed on the edges of the sheet. In the Fourcault system the sheet is drawn upwardly through a debiteuse from a bath of molten glass by drawing rolls which extend transversely of and on opposite sides of the sheet. Because of the beads which are formed on the edges of the sheet, the bodies of the drawing rolls must be made shorter than the width of the sheet, otherwise the rolls would contact only at the beads. The ends of the drawing rolls are reduced in diameter so that the beads may pass between them. This leaves openings between the rolls at the edges of the sheet which allow particles of broken glass to fall into the bath thereby resulting in drawing imperfect sheets.

My invention provides flags or shields arranged within the drawing machine adjacent the ends of the drawing rolls in order to prevent the particles from falling into the bath. In ordinary practice, two flags only are needed in each machine but if found desirable more than two may be used.

In the accompanying drawings, which illustrate the present preferred embodiment of my invention, Figure 1 is a front elevation of a Fourcault sheet glass drawing machine, certain parts being removed or broken away;

Figure 2 is a horizontal section on the line II—II of Figure 1;

Figure 3 is a vertical section on the line III—III of Figure 2;

Figures 4 and 5 are respectively an end elevation and a plan view of the flag; and Figure 6 is a section on the line VI—VI of Figure 5.

Figure 1:
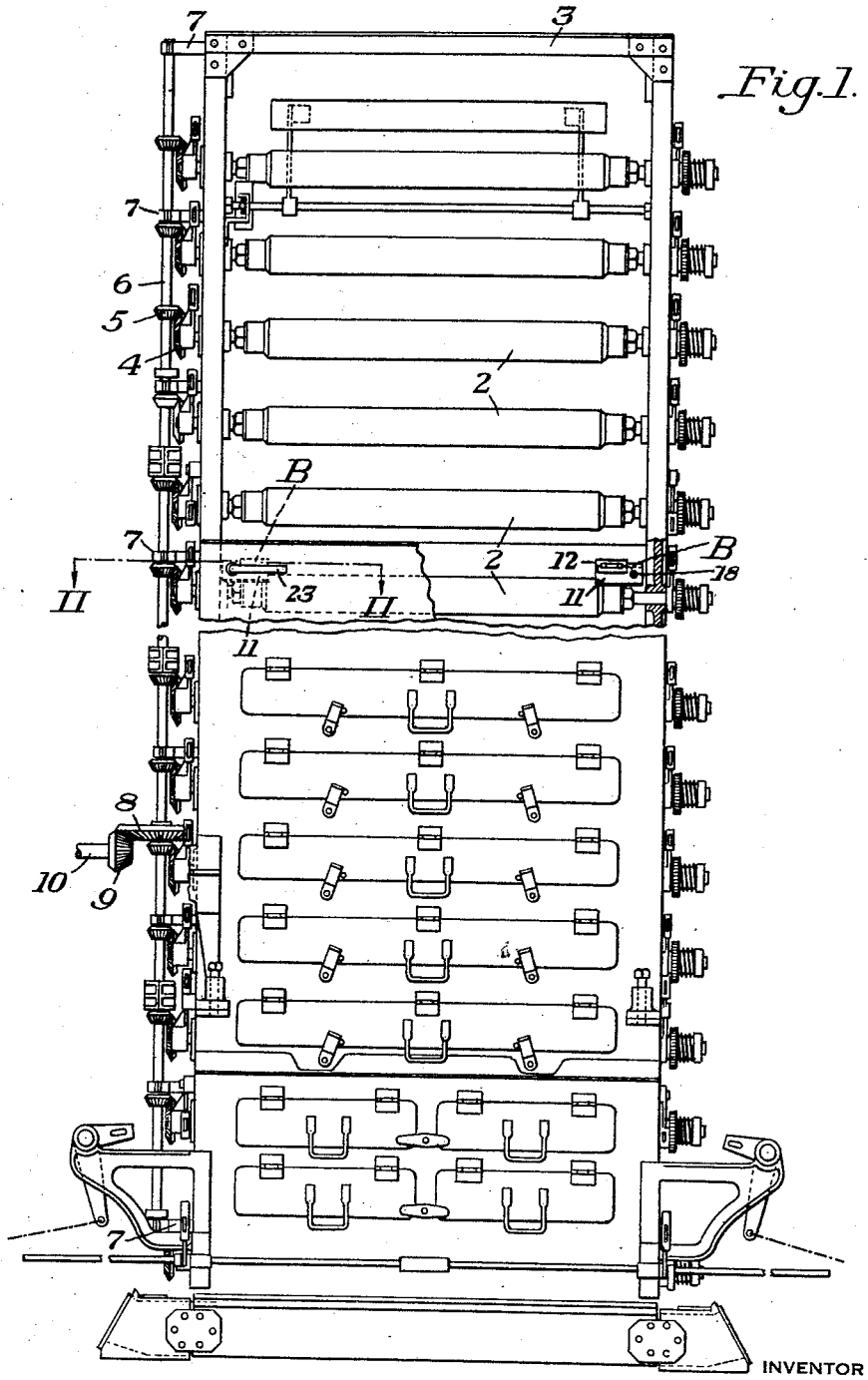

Referring to Figures 1 and 2 a Fourcault sheet glass drawing machine is shown. The glass sheet A is drawn between drawing rolls 2 arranged in the usual manner within a frame 3. The rollers are driven through bevel gears 4 which mesh with bevel gears 5 secured to a shaft 6. The shaft is mounted in brackets 7 secured to the top and bottom of the frame 3. The shaft 6 has a bevel gear 8 secured thereto which meshes with a bevel gear 9 mounted on a shaft 10 which is driven by any desired means. Flags B are arranged within the machine adjacent the ends of the rollers.

The flag B is shown in detail in Figures 2 to 6. As illustrated, it comprises a body portion 11 of sheet metal having two pivoted flaps 12 mounted thereon. The sides of the body portion slope downwardly and outwardly from its center and are braced by a reinforcing strip 13 welded to the body at 14. The body has a recess 15 formed therein through which the edges of the drawn sheet pass. The flaps 12 are hinged as indicated at 16, and have recesses 17 which are smaller than the recess in the body. The flaps 12 have extensions 12′ at their outer edges which substantially close the outer edges of the slots 15 in the body portion 11, so as to prevent broken glass from falling into the bath or contacting with the sheet. In Figure 4, the dotted lines indicate the position of the flaps 12 when a sheet is being drawn. The full lines and chain lines indicate how the flaps may be rotated about the pivots 16.

Each flag is supported by a rod 18 which fits in bosses 19 formed on the flag body. The rod 18 passes through the upper portion of the flag, as shown in Figure 4, and is mounted for rotation in the front and rear walls 20 and 21 respectively of the glass drawing machine. Relative motion between the rod 18 and the flag B is prevented by a set screw 22. The rod 18 has a handle 23 which, when rotated, moves the flag from the full line position to the chain line position indicated in Figure 3. The full lines indicate the operative position of the flag while the chain lines indicate its inoperative position. The flag may be moved along the rod 18 by loosening the set screw 22. This adjustment is sometimes needed in order to make the openings 15 and 17 in the flag coincide with the line of draw of the sheet.

As shown in Figure 2, when a glass sheet is being drawn the flaps 12 contact with the beads 24 formed on the edges of the sheet. The flaps lie so close to the edges of the sheet that substantially all of the particles are deflected by the sloping flaps and body portions of the shield away from the sheet which is being drawn. If the thickness of the sheet should be varied the flaps open up an amount sufficient to take care of the increased thickness but still prevent glass particles from falling into the bath.

Since the flag is supported by the rotatable rod 18, a wider sheet of glass than that shown in the drawings may be drawn by simply turning the handle 23 to rotate the rod 18 and flag B so as to move the slots 15 and 17 farther away from the edge of the sheet.

I have illustrated and described the present preferred embodiment of my invention. It is to be understood, however, that the invention may be otherwise embodied without departing from the spirit of the invention or the scope of the following claims.

I claim as my invention:

1. A flag for Fourcault sheet glass drawing machines, comprising a body portion having flaps pivoted thereto and arranged to deflect particles of glass away from the sheet, supporting means secured to the flag, said supporting means being rotatably mounted whereby upon rotation of said means the flag is rotated to dispose it for introducing a bait between the drawing rolls.

2. A flag for Fourcault sheet glass drawing machines, comprising a body portion having flaps pivoted thereto and arranged to deflect particles of glass away from the sheet, a supporting rod secured to said flag and adapted to be mounted for rotation in the machine, and means for rotating said rod in order to dispose it for introducing a bait between the drawing rolls.

3. In combination with a Fourcault sheet glass drawing machine, a flag comprising a body portion having downwardly and outwardly sloping sides, said body portion having a recess provided therein through which a glass sheet may be drawn, and flaps pivoted to the body portion and adapted to contact with the edges of the sheet to deflect particles therefrom, the outer edges of the flaps having extensions which substantially close the recess in the body portion at the outer edge thereof.

4. A flag for Fourcault sheet glass drawing machines, comprising a body portion having a slot through which the edge of the sheet can be drawn, flaps pivoted to the body portion and adapted to contact with the bead formed on the border of the sheet to deflect particles of glass therefrom, the outer edges of the flaps having extensions which substantially close the slot in said body portion at the outer edge thereof.

5. A flag for Fourcault sheet glass drawing machines, comprising a body having downwardly and outwardly sloping sides and having a recess through which the edge of a glass sheet may be drawn, flaps pivoted to the body and arranged to deflect particles of glass away from the sheet, said flag being supported on a rotatable rod extending forwardly and rearwardly of the machine, and means for adjusting the flag along the rod to move the flag in accordance with the line of draw of the sheet.

6. In combination with a Fourcault sheet glass drawing machine having drawing rolls, flags arranged at the edges of the rolls, said flags comprising a body portion having flaps comprising a body portion having downwardly and outwardly sloping sides and having a recess through which the edge of the sheet may be drawn, flaps pivoted thereto and arranged to deflect particles of glass away from the sheet, said flags being located in the drawing machine above the second pair of drawing rolls.

In testimony whereof I have hereunto set my hand.

HOWARD ZEH.